United States Patent [19]
Zalkin

[11] Patent Number: 4,494,358

[45] Date of Patent: Jan. 22, 1985

[54] TORSIONAL TORQUE CONTROLLED FRICTION SCREWING HEAD FOR CAP INSTALLATION

[75] Inventor: Michel Zalkin, Saint-Cloud, France

[73] Assignee: Etablissements Andre Zalkin et Cie, Rueil, France

[21] Appl. No.: 356,583

[22] Filed: Mar. 9, 1982

[30] Foreign Application Priority Data

Mar. 25, 1981 [FR] France ............... 81 06033

[51] Int. Cl.³ ............... B65B 7/28; B67B 1/06
[52] U.S. Cl. ............... 53/331.5; 192/89 A; 192/56 R; 464/39
[58] Field of Search ............... 53/331.5, 333, 334; 192/89 A, 56 R, 41 S, 56 C, 112 BA; 464/37, 38, 39, 47

[56] References Cited
U.S. PATENT DOCUMENTS

| | | | |
|---|---|---|---|
| 1,828,370 | 10/1931 | Huddle | 464/39 |
| 2,561,913 | 7/1951 | Dodge | 464/39 |
| 2,983,122 | 5/1961 | Polzin | 464/39 |
| 3,031,822 | 5/1962 | Dimond | 53/331.5 X |
| 3,797,618 | 3/1974 | Peterson et al. | 192/12 BA |
| 3,913,301 | 10/1975 | Keller et al. | 53/331.5 |
| 4,222,215 | 9/1980 | Takano | 53/331.5 |
| 4,254,603 | 3/1981 | Obrist | 53/331.5 X |
| 4,295,320 | 10/1981 | Willingham | 53/331.5 X |
| 4,364,218 | 12/1982 | Obrist | 53/331.5 |

Primary Examiner—Robert L. Spruill
Assistant Examiner—Donald R. Studebaker
Attorney, Agent, or Firm—Beveridge, DeGrandi & Kline

[57] ABSTRACT

The invention relates to a screwing head, notably intended for installing caps on containers of bottle of similar type. This screwing head comprises an upper bush (8) fixed to the hub (1) and connected by elastic means to a lower bush (2) mounted to slide on the hub (1), these elastic means (5) being designed on the one hand to apply sufficient pressure to engage the bush (2) onto a friction disc (4) fixed to a bottom unit (3) provided with a screwing head and on the other hand to apply a preset torsional torque which, by working in conjunction with cam means, enables the bush (2) to be released from the friction disc (4) when the cap comes to the end of the tightening operation.

6 Claims, 2 Drawing Figures

TORSIONAL TORQUE CONTROLLED FRICTION SCREWING HEAD FOR CAP INSTALLATION

BACKGROUND OF THE INVENTION

The invention lies within the area of screwing caps onto containers like bottles and similar types. It relates more particularly to a friction screwing head controlled by twisting torque for installing caps. Among the screwing heads usually used in the bottling industry those provided with a friction clutch can be mentioned in particular. The major drawback of this type of clutch lies in the fact that the application torques achieved for installing the cap are not constant, owing either to the head heating up during operation or to the environmental influences in the presence of nuisances like: moisture, steam, liquid splashing and others of similar type.

SUMMARY OF THE INVENTION

The present invention aims to obviate this drawback by providing a screwing head which enables a constant application torque to be obtained when installing caps.

The screwing head according to this invention comprises a bottom element or unit mounted to swivel round a hub and fixed at its lower end to a cap gripping means, while the friction means are fixed to its upper end; this screwing head is also characterized in that it comprises an upper element or bush connected by elastic means to a lower bush mounted with a sliding fit on the hub, these elastic means being designed on the one hand to apply sufficient pressure to engage the bush on the said friction means provided at the upper end of the bottom unit, and on the other hand to apply a preset twisting torque which is roughly equal to the cap screwing torque so that, by working in conjunction with cam means, the lower bush is enabled to slip free from the friction means when the cap tightening operation is completed.

It is advantageous for the friction means to consist of a friction disc made of a material possessing a very high coefficient of friction. The cam means may consist of oblong slots made in the body of the sliding bush, oriented obliquely and at 180° to each other round the hub's longitudinal axis. Inside these slots stops are provided so as to be able to move with a certain amount of play; these stops are of roller or ball bearing type mounted on a pin transverse to the hub and fixed thereto.

DESCRIPTION OF THE DRAWINGS

The invention will be more clearly understood on reading the following description of a non-restrictive embodiment of the screwing head, reference being made to the appended drawing in which.

DESCRIPTION OF THE PREFERRED EMBODIMENT

Figure 1:
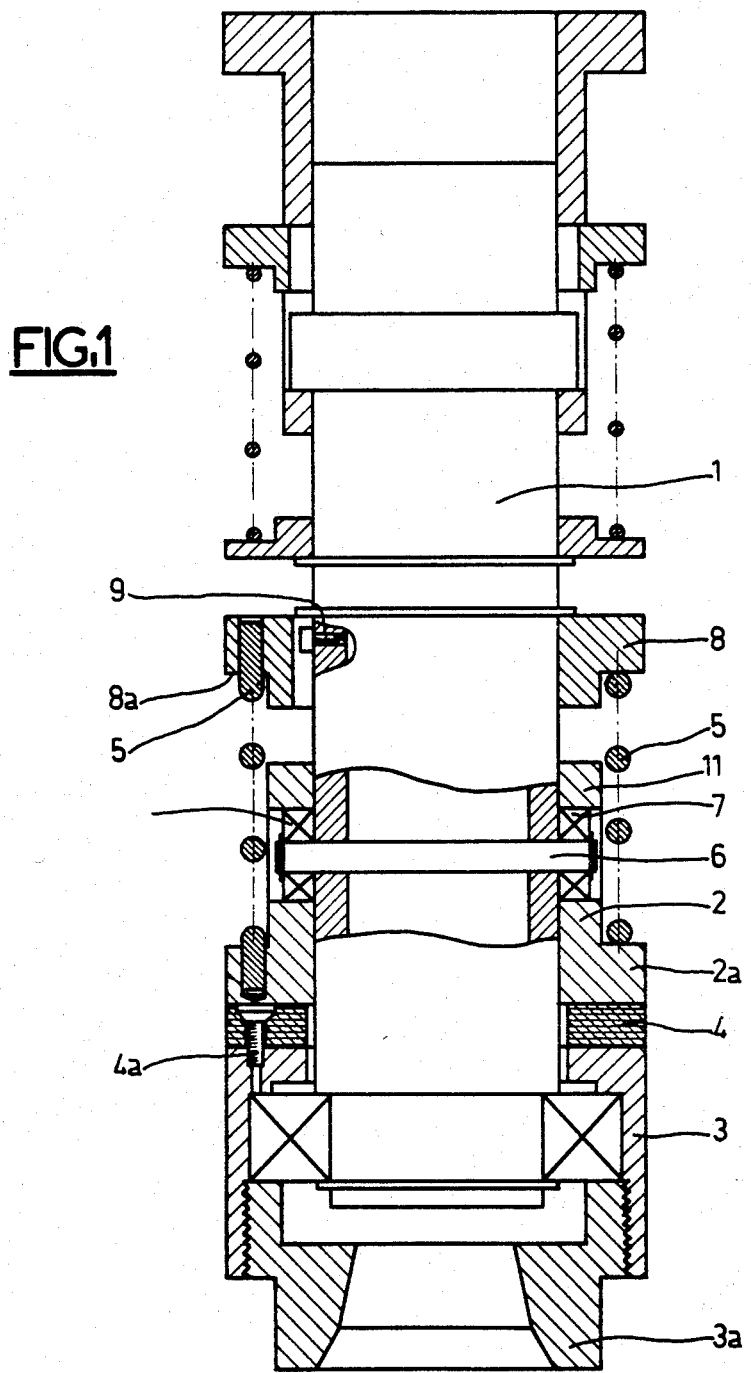
FIG. 1 is a longitudinal axial section of the screwing head according to the invention.
Figure 2:
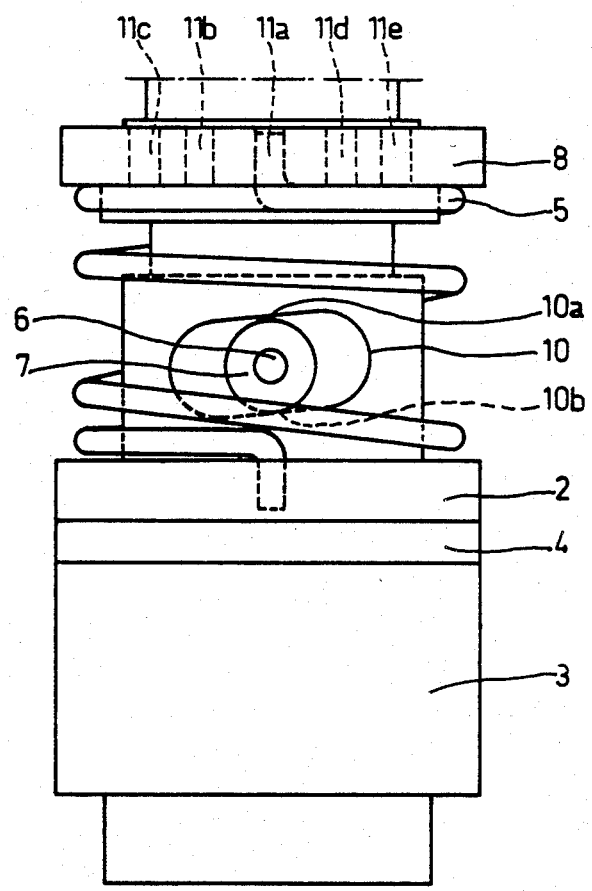
FIG. 2 is a part side elevation view of the screwing head in FIG. 1.

The screwing head according to the invention comprises a hub 1 on the bottom end of which a bottom unit 3 is fitted to swivel, this bottom unit being provided at its free end with a screwing taper 3a or any other means of gripping the cap. This unit 3 is fixed at its other end to a friction disc 4 made of material possessing a high coefficient of friction. A bush provided with a collar 2a is placed above the friction disc 4 in close contact with it through the under face of its collar 2a. Two cam slots 10 are made in the bush body 2 at 180° to each other and sloping at a certain angle with respect to the hub axis. In each of these slots is placed a roller or ball bearing 7 attached to the hub 1 by means of a pin 6 perpendicular to the longitudinal axis of the hub. These rollers or bearings 7 operate as cam followers, and they are arranged to be capable of rotating freely round their pin.

The bush 2 is driven by the hub 1 in its rotation through a torsion spring attached by one of its ends to the collar 2a and bearing against it while the other end is force fitted into a housing 11a provided on the under face of the bush 8 which is fixed to the hub 1. This spring 5 also acts as a compression spring to press the collar 2a of bush 2 onto the friction disc 4, thus locking this bush to unit 3 in rotation with the hub. Furthermore, when it is wound up the torsion spring tends to rotate the bush 2 in a clockwise direction, which results in placing the lower edge of the slots 10b in contact with the rollers 7 and jamming the bush between the rollers 7 and the unit 3. This effect contributes to fixing the bush 2 and unit 3 together in rotation. In order to obtain the required twist torque bush 8 may be rotated on itself round the hub and locked to this hub in such a manner as to wind up the torsion spring 5 to a greater or lesser extent. In order to fine adjust the twist torque of the spring 5 a certain number of openings 11a, 11b, 11c, 11d, 11e with the same bore have been provided on the bottom shoulder 8a of the bush 8 and the upper end of the spring 5 can be force fitted into these openings. At the final stage of installing the cap, once this has been tightened to the required torque, the unit 3 stops rotating and, since the friction disc has a high coefficient of friction, it makes the collar 2a, and therefore the bush 2, pivot slightly in an anti-clockwise direction round the hub, overcoming the resistance of the torsion spring. This swivelling occurs within the limits of the play, around 5 to 10/100 mm, of the rollers inside the two slots, which play is made up for when the top edge 10a of each slot 10 comes into contact with the rollers 7, by a very slight upwards movement of the bush 2, which results in the unit 3 being released and the tightening force exerted on the cap being thus limited.

If, for any reason, the coefficient of friction of the friction disc 4 happens to raise, the tightening torque applied to the cap will remain the same since this is determined only by the initial adjustment of the torsional torque of the spring 5. As soon as the intended tightening torque has been achieved the bottom unit 3 will no longer be driven in the same manner as described above.

When the operation is completed and the cap is no longer engaged in the gripping taper fixed to unit 3, or when the controlled jaws have released it, the torsion spring 5 re-positions the bush 2 and the bottom unit 3 in the engagement position by lowering the said bush 2 are to the slope, of around 4°, of the slots 10.

The invention is in no way limited to the embodiment described above but encompasses all modifications and variants within the range of a skilled specialist, based on the same basic principle.

What is claimed is:

1. A screwing head for tightening caps on containers, comprising, a hub member which is adapted to be rotated about its axis in a forward cap-tightening direction, a unit which has a cap gripping means on its lower end, said unit being rotatably supported on the hub member, a lower bush member which is slidably supported on the hub member above said unit, a friction disc which provides a friction clutch between the unit and the lower bush member, a torsional and compression spring means which has one end connected to the lower bush member and an opposite end affixed to the hub member, said spring means being under torsion to provide forward rotational displacement of the lower bush member relative to the hub member, said spring means also being under compression to apply an axial compressive force to said frictional disc, a cam mechanism operable between said lower bush member and said hub member, said cam mechanism including a cam slot in one member and a cam follower on the other member, said cam slot sloping at a given angle relative to a transverse plane of the hub member and having upper and lower slopes, said cam follower acting on both upper and lower slopes of the cam slot, said cam mechanism being operable to lock by a wedging action the lower bush member with the friction disc until the lower bush member rotates against the torsional force of the spring means in a reverse direction of rotation relative to the hub member when the cap is screwed on the container to the required torque, said cam mechanism being operable in response to said reverse direction rotation to raise the lower bush member slightly to permit slippage of said friction clutch.

2. A screwing head according to claim 1 including an upper bush for affixing the opposite end of the spring means to the hub member, said upper bush being nonrotatably attached to the hub member and having at least one opening for receiving the opposite end of the spring means.

3. A screwing head according to claim 2 wherein said upper bush has a plurality of said openings for receiving the opposite end of the spring means, whereby the opposite end of the spring means may be moved from one opening to another to adjust the torsion torque of the spring means.

4. A screwing head according to claim 1 wherein said cam mechanism includes two cam followers and two said slots which are diametrically opposed.

5. A screwing head according to claim 4 including a pin which is connected perpendicularly to said hub member, said cam followers being rotatably mounted on the opposite ends of said pin.

6. A screwing head according to any one of the claims 1–5 wherein said given angle is about 4°.

* * * * *